United States Patent Office 3,645,979
Patented Feb. 29, 1972

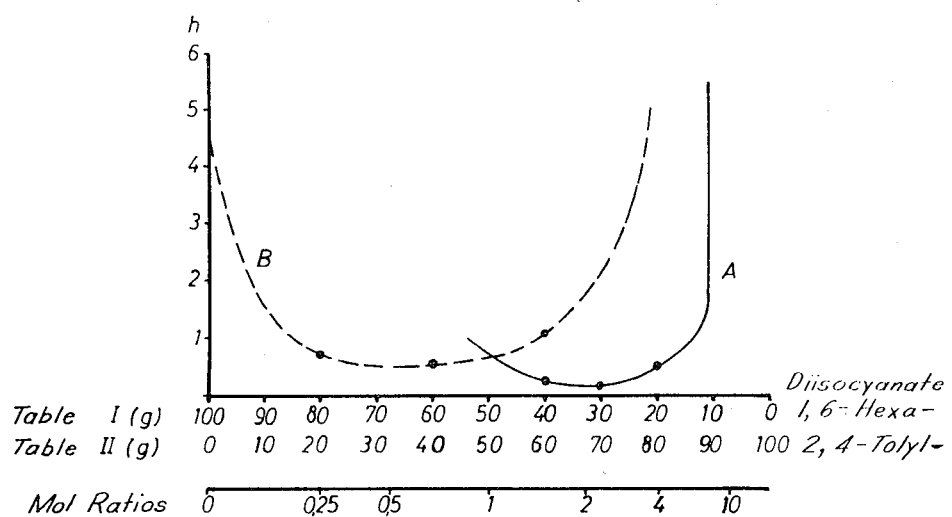
h = Time in hours
(g) = Parts by weight

3,645,979
PROCESS FOR COPOLYMERIZATION OF AROMATIC AND ALIPHATIC POLYISOCYANATES TO FORM POLYISOCYANURATES
Dietrich Liebsch, Leverkusen, and Wilhelm Altner, Burscheid, Germany, assignors to Farbenfabriken Bayer Aktiengesellschaft, Leverkusen, Germany
Filed Jan. 25, 1967, Ser. No. 611,693
Claims priority, application Germany, Feb. 2, 1966, F 48,322
Int. Cl. C08g 22/04, 22/26; C07d 55/38
U.S. Cl. 260—77.5 NC        7 Claims

ABSTRACT OF THE DISCLOSURE

A method for preparing polyisocyanates having at least one isocyanurate ring which comprises polymerizing an aromatic and an aliphatic or araliphatic polyisocyanate in the presence of an organic phosphine, the aliphatic or araliphatic polyisocyanate being present in such an amount that more than about 0.5 aliphatically bound —NCO group is present per aromatically bound —NCO group, preferably 0.5 to 10. The products per se have utility as adhesives, lacquers, casting resins, and foams, and also as the isocyanate component in other reactive systems.

---

This invention relates to polymeric isocyanates, particularly to polymeric aromatic polyisocyanates and more particularly to a process for polymerizing aromatic polyisocyanates.

Heretofore, it was known that organic mono- and polyisocyanates may be converted into dimeric, trimeric or polymeric compounds in the presence of catalytic quantities of basic compounds. In addition to the strongly basic compounds, such as alkaline metal salts of organic acids and tertiary amines, tertiary aliphatic and mixed aliphatic-aromatic phospines were eminently suitable as catalysts for the trimerization reaction.

Although phosphine catalysts provide for low temperature polymerization (about 50° C.), they have the following disadvantages In order to be able to complete the polymerization process within an economically reasonable period of time, it is necessary to use relatively large quantities of the catalyst which is very sensitive to the process conditions. This large quantity of catalyst thus remains in the reaction mixture together with a correspondingly large quantity of inhibitor.

In addition, when 2,4-toluylene diisocyanate or mixtures containing 2,4-toluylene diisocyanate are used as the major component, large quantities of solid reaction products consisting of 3,3'-diisocyanate-4,4'-dimethyldiphenyl uretdione and addition compounds of isocyanurate isocyanates are formed at temperatures below 100° C., especially in the presence of excess toluylene diisocyanate. These compounds constitute a thick crystalline paste which is extremely difficult to stir and renders manipulation of the reaction mixture and heat transfer so difficult that it is necessary to add suitable solvents. As soon as solvents are used in the polymerization system, then larger quantities of catalyst must be added.

Furthermore, when aromatic polyisocyanates are used in which the reactivity of the two isocyanate groups is about equal, it is often impossible to prepare even in the presence of phosphines, low molecular weight trimers having a single or a small number of isocyanurate rings. For example, U.S. patent specification 2,801,244 describes the use of diisocyanates in which one of the isocyanate groups is sterically hindered, otherwise, when 4,4'-diisocyanate-diphenylmethane which has NCO groups of equal reactivity is treated with phosphine catalysts with or without solvents, high molecular weight polymers containing uretdione structures are produced. Consequently, due to their poor solubility these polymers cannot be used as reaction lacquer components or adhesive components.

Isocyanate polymers containing a ring structure have been prepared in British Pat. 856,372 by interacting two molecular proportions of an aromatic isocyanate or diisocyanate in which the —NCO groups are substituents in an aromatic ring with one equivalent proportion of an organic mono- or polyisocyanate in which the —NCO groups are not directly attached to an aromatic ring in the presence of a phosphine catalyst. However, the ratio of aliphatic to aromatic icocyanate groups in never higher than 0.5. Consequently, high molecular weight insoluble intermediate products and by-products are formed which are difficult to remove from the desired polymerization product.

In addition, low molecular weight trimers of aromatic diisocyanates in which the isocyanate groups are of equal reactivity as, for example, 4,4'-diphenylmethane diisocyanate are extremely difficult, if not impossible to prepare by the process described in the British patent.

It is therefore an object of this invention to provide a process for polymerizing icocyanates. Another object of this invention is to provide a process for trimerizing aromatic isocyanates. Another object of this invention is to provide polymeric isocyanates which are substantially free of color. Still another object of this invention is to provide a process for polymerizing polyisocyanates having —NCO groups of equal reactivity. A further object of this invention is to provide polymeric isocyanates substantially free of uretdione groups. A still further object of this invention is to provide an efficient process for polymerizing aromatic isocyanates in the presence of phosphine catalysts.

The foregoing objects and others which will become apparent from the following description are accomplished, generally speaking, by providing a method for trimerizing aromatic polyisocyanates in the presence of aliphatic isocyanates and catalytic amounts of aliphatic, araliphatic or mixed aliphatic-aromatic phosphines.

In other words, we have found that aliphatic isocyanates also have a natalytic effect upon the trimerization of aromatic isocyanates, particularly where more than 0.5 aliphatic —NCO groups and up to about 10 aliphatic —NCO groups per aromatic —NCO group are present.

By the term "trimerization" we mean to include compounds having a single isocyanurate ring as well as those having several isocyanurate rings, depending on the functionality of the isocyanates used.

The drawing illustrates the catalytic effect of aliphatic isocyanates in the trimerization of aromatic isocyanates in a phosphine catalyzed system. The continuous curve (A) illustrates the co-catalyst effect of aliphatic isocyanates on the trimerization of aromatic isocyanates in a phosphine catalyzed system. Broken curve (B) illustrates the co-catalyst effect of aliphatic isocyanates on the trimerization of aromatic isocyanates in a solvent-phosphine catalyzed system.

The addition of aliphatic isocyanates provides for greatly increased reaction velocity which in some cases may be more than 10 times the reaction velocity observed under the same conditions when using pure aromatic polyisocyanate. The catalytic effect of the aliphatic isocyanates is particularly surprising in view of the fact that aliphatic mono- or polyisocyanates alone are very much more difficult to trimerize or polymerize even in the presence of high phosphine concentrations than their aromatic compounds. One would therefore expect the addition of aliphatic isocyanates to retard the trimerization reaction. However, this effect is not observed until the concentration of aliphatic isocyanates in the reaction mixture exceeds about 4 to 5 times the concentration of aromatic isocyanate groups.

In addition, the aliphatic isocyanates suppress the formation of high molecular weight intermediate or by-products which are insoluble in the reaction mixture. Furthermore, aromatic diisocyanates, such as, 4,4'-diisocyanate-diphenylmethane, having isocyanate groups of equal reactivity may now be trimerized in the presence of phosphine catalysts. However, it was found that it was essential to have at least 0.5 aliphatic-NCO groups present per aromatic—NCO group in order to obtain a co-catalytic effect and to inhibit the formation of insoluble intermediate products and by-products.

Consequently, in the trimerization of aromatic polyisocyanates the reaction can be carried out successfully without the formation of precipitates and free of solvents only if the ratio of aliphatic to aromatic isocyanate groups is greater than 0.5 and preferably greater than 1.

Surprisingly, by the process of this invention an increase in the proportion of aliphatic isocyanates in the reaction mixture does not necessarily entail an increase in the proportion of aliphatic components in the reaction product.

In fact, the aliphatic isocyanate groups only take part to a limited extent in the trimerization reaction as long as temperatures of about 120° C. are not exceeded during the trimerization, and the trimerization reaction is stopped before the quantity of aromatic isocyanate groups in the reaction mixture has become depleted. If, for example, a reaction mixture of 67% by weight of 1,6-hexamethylene diisocyanate and 33% of weight of 2,4-toluylene diisocyanate (NCO ratio about 2) is trimerized until the NCO content of the reaction mixture has dropped from 49.3 to 35%, the trimer contains about 40% aliphatic component and the aromatic component in the monomeric mixture of the distillate or extract is reduced to 10 to 12% (see Example 1). In the trimerization of 4,4'-diphenylmethane diisocyanate, the ratio of aliphatic to aromatic isocyanate groups should preferably be even greater than 1.5 if completely soluble trimers are to be obtained. With an NCO ratio of 2, 1,6-hexamethylene diisocyanate is only built into the molecule to an extent of about 28% if the reaction is stopped at an NCO content of 35% (see Example 2). However, as the proportion of aliphatic component in the trimer increases, the character of the trimer is naturally modified. The products thus obtained from this invention are distinguished by increasing fastness to light and flexibility.

Any aromatic polyisocyanates may be used as starting material for the process of the invention. Especially suitable are 2,4- and 2,6- toluylene diisocyanate, 2,4'- and 4,4'-diisocyanate-diphenylmethane as well as m- and p-phenylene diisocyanate,
1-methoxyphenylene-2,4-diisocyanate,
diphenyl-4,4'-diisocyanate,
diphenylether-4,4'-diisocyanate,
2,2-diphenylpropane-4,4'-diisocyanate,
naphthalene-1,5-diisocyanate,
tetrahydronaphthalene-1,5-diisocyanate,
naphthalene-2,6-diisocyanate,
3,3'-dimethyldiphenyl-4,4'-diisocyanate,
3,3'-dimethoxydiphenyl-4,4'-diisocyanate,
2,2'-dimethyldiphenylmethane-4,4'-diisocyanate,
2,5,2',5'-tetramethyldiphenylmethane-4,4'-diisocyanate,
diphenylsulfide-2,4'-diisocyanate,
diphenylsulfide-4,4'-diisocyanate,
diphenylsulfone-4,4'-diisocyanate,
diphenylmethylsulfone-4,4'-diisocyanate,
4-methyldiphenylsulfone-2,4'-diisocyanate,
4,4',4"-triisocyanate-triphenylmethane,
naphthalene-1,3,7-triisocyanate,
diphenylmethane-2,4,6-triisocyanate,
4,4'-dimethyldiphenylmethane-2,2'5,5'-tetraisocyanate,
tris-(p-isocyanate-phenyl)-thiophosphoric acid ester and the like.

Examples of aliphatic, cycloaliphatic and araliphatic isocyanates which catalyze the trimerization of the aromatic polyisocyanate in the process according to the invention and which have to be present in the reaction mixture in a quantity such that the ratio of aliphatic to aromatic isocyanate groups (NCO ratio) is greater than 0.5, are isocyanates having from 1 to 18 carbon atoms, preferably from 2 to 10 carbon atoms, such as 1,4-tetramethylene diisocyanate, 1,6-hexamethylene diisocyanate, 1,3- and 1,4-xylylene diisocyanate and their homologues substituted in the nucleus. 1-methyl-2,4-isocyanato-cyclohexane, 4,4' - dicyclohexyl methane diisocyanate, 1-isocyanate - 3 - isocyanatomethyl - 3,5,5' - trimethylcyclohexane, 2,2'4 - trimethyl-1,6-diisocyanato hexane. Aliphatic monoisocyanates such as methyl isocyanates, propyl isocyanate, butyl isocyanate, hexyl isocyanate, octyl isocyanate, ω-chlorohexyl isocyanate long chained compounds such as stearyl and oleyl isocyanates and araliphatic compounds such as benzyl isocyanate behave in a similar manner.

Only aliphatic, araliphatic and mixed aliphatic-aromatic phosphines are suitable as catalysts in the process of this invention. Suitable examples are triethyl phosphine tripropyl phosphine, triisopropyl phosphine, ethyl-dibutyl phosphine, tri-n-butyl phosphine, ethyldimethyl phosphine, propyldimethyl phosphine, hexyldimethyl phosphine, diethyldipropyl phosphine, dimethylbenzyl phosphine, dimethylphenyl phosphine and tribenzyl phosphine. It is also possible to have two alkyl groups linked together to form a ring as in the case of p-butyl-phosphacyclopentane. Since the reaction can be stopped at any time by the addition of well-known inhibitors, it is possible to obtain reaction products having different degrees of trimerization. Particularly suitable inhibitors are alkylating agents such as dimethylsulphate, methyl iodide or toluene-sulphonic acid esters and acylating agents such as benzoyl chloride, acetyl chloride, N-phenyl-N-methylcarbamic acid chloride or chloroformic acid esters. The trimerization reaction should be stopped when the NCO content has dropped to 50 to 60% of the initial value.

Unreacted monomers can then be carefully removed after the reaction has been stopped, by high vacuum distillation in suitable evaporators, or by extraction with suitable selective solvents in which only monomers but not the trimers are soluble, e.g. aliphatic or cycloaliphatic hydrocarbons.

The catalysts are highly effective even at temperatures only slightly above room temperature, consequently, the polymerization temperature is not critical. The trimerization reaction may occur between about −20° and 150° C., however, it is preferred that the temperature be maintained between about 40° and 120° C. in order to avoid formation of carbodiimides which take place at these higher temperatures and also to obtain as far as possible colorless reaction products.

The quantity of catalyst used depends largely on the quantity of aliphatic isocyanate added as co-catalyst. The greater the quantity of aliphatic isocyanate added, the smaller the quantity of catalyst needed to obtain the desired reaction product. Usually the amount of catalyst ranging from about 0.001 to 0.1% is sufficient; however, when optimum conditions are employed, i.e. at an isocyanate ratio of from one aliphatic NCO-group: one aromatic NCO group to two aliphatic NCO groups: one aromatic NCO group, an amount of from 0.01 to 0.05% is sufficient.

The process of the invention is best carried out in the absence of solvents. This can be achieved by the addition of suitable quantities of aliphatic isocyanates and the choice of suitable reaction temperatures. Where solvents are used in carrying out the reaction, the amount of catalyst should be increased. In addition, the polarity of the solvent has an effect upon the amount of catalyst; the less polar the solvent, the greater the amount of catalyst which must be used. If it is desirable to obtain low molecular weight reaction products which are soluble in esters, ketones or chlorinated hydrocarbons, it is advantageous to stop the trimerization reaction before all the monomeric isocyanate has undergone reaction and thereafter separate the monomeric isocyanate from the solvent by extraction or by (thin layer) distillation. The separated monomeric mixtures may be analyzed by determining their refractive indices. These mixtures, which have a low aromatic polyisocyanate-content, can be re-used as starting materials in a new trimerization reaction after first replacing the monomers used in the initial trimerization reaction.

Mixed trimers will, of course, also be formed if the proportion of aliphatic isocyanates in the reaction mixture corresponds to an NCO ratio of less than 0.5. In that case one will, however, have to consider the disadvantages already indicated above, i.e. employing a large quantity of catalyst, and the formation of insoluble by-products as well as substantially lower yields of the desired product. The reason for this is that the trimerization reaction must be stopped at a very early stage, the trimer separated and the aliphatic isocyanate in the distillate or extract replaced. Such a procedure is not comcercially feasible at all.

Generally, the products of the process still have free NCO groups; however, they may be trimerized to such an extent that no free NCO groups are present. The products thus formed by this process are nonvolatile materials, which in rare cases are viscous liquids and in most cases are solid resins at room temperature. They are readily soluble even at room temperature in numerous organic solvents such as esters, ketones and chlorinated hydrocarbons. Examples of suitable esters are ethyl acetate, butyl acetate and ethylene glycol ether acetate; examples of suitable ketones are acetone, methyl ethyl ketone or cyclohexanone. Examples of suitable chlorinated hydrocarbons which may be used as solvents for these products are dichloromethane or chlorobenzene and the like.

The products of the process, either pure or in solution, can also be converted into their "splitter form" i.e. into the form of their reaction products with phenols, acetoacetic esters, malonic esters or diphenylamino derivatives. These splitters behave like the free isocyanates at high temperatures and may advantageously be used wherever it is desired to leave the reaction mixtures for prolonged periods with compounds containing hydroxyl or amino groups, and when the actual cross-linking reaction is to be carried out at elevated temperatures. It is also possible to react the reaction products, either pure or in solution, with suitable mono- or polyalcohols, amines or water or compounds which liberate water to form substantially cross-linked products having low isocyanate values.

The products of the process can be used as adhesives, as hardeners for resins and for polyester- and polyether lacquers, as one-component lacquers and for the production of casting resins, elastomers and foam plastics.

According to the procedure of the present invention polyisocyanates can be obtained which contain one isocyanurate nucleus comprising two mols of aromatic and one mol of aliphatic diisocyanate. If the molar ratio of the starting materials is more than 10 mols of aliphatic diisocyanate per one mol of aromatic diisocyanate preferably polyisocyanates with one isocyanurate ring are obtained consisting of compounds of Formula II besides those of Formula I.

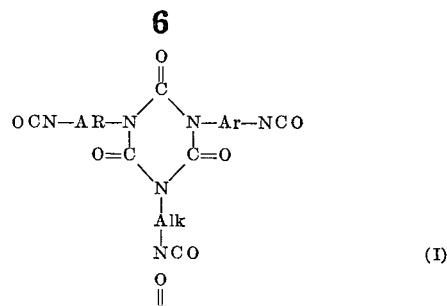

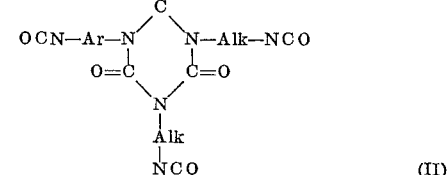

If reaction proceeds to a higher yield than 20 percent increasing amounts of higher molecular weight polymers are obtained, because also the free NCO groups of the above isocyanurates take part in further trimerisation, in other words, products are obtained which contain increasing amounts of 2, 3 or more of isocyanurate rings in the molecule. These compositions of matter thus obtained are novel and comprise (in general more than 50 percent) a mixture of compounds of the following formula

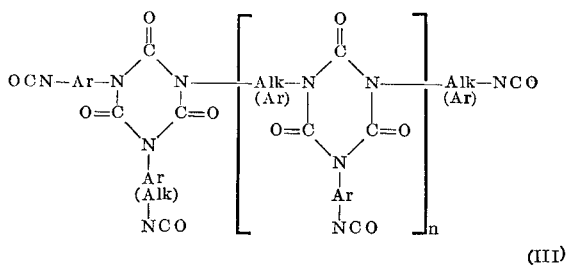

$n = 1, 2, 3, 4, 5 \ldots$

Of course the compositions are technical mixtures with variable $n$ and distribution of Ar and Alk in a statistical way and depending on the molar ratio of the starting materials. The composition further contains more or less amounts of compounds according to Formula I and II and more or less amounts of higher molecular weight polymers with more than one isocyanurate ring in which further trimerisation has occurred in the side branches to give a branched material or even ring closure involving several isocyanurate rings.

To give an example, the composition of matter produced in accordance with Example 1 comprises molecules of the following formula complying with the following analytical data.

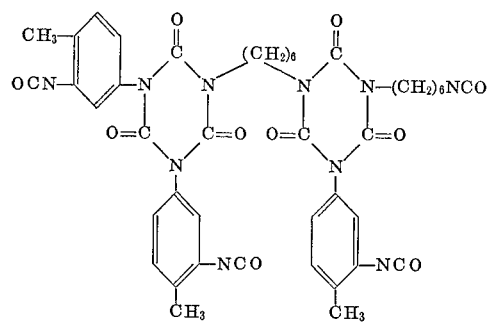

NCO content 19.8%, found 19.6%,
molecular weight 850 to 870, found 858,
content of groupings derived from the aliphatic isocyanate starting material 42.0%, found 39.2%,
content of free aliphatic isocyanate groups, calculated in percent on the free NCO content about 22%, found 25%, IR spectrum shows a clear isocyanurate structure with the catalysing bands at 4.4 to 5.9 and 7.0μ.

The invention is further illustrated by the following examples in which all parts are by weight unless otherwise specified.

EXAMPLE 1

Approximately 170 parts of 2,4-toluylene diisocyanate are heated to about 60° C. with about 330 parts of 1,6-hexamethylene diisocyanate and trimerized by the addition of about 0.125 part of tri-n-butylphosphine. The reaction mixture must then be slightly cooled. If an NCO value of about 36% has been reached after about 4.5 hours, the reaction is stopped by the addition of about 0.1 part of methyl-p-toluenesulphonate and about 0.1 part of dimethylsulphate followed by heating for a short period at about 100° C. The unreacted monomeric mixture is distilled off by slowly passing the reaction mixture through a thin layer evaporator (vacuum 0.8 mm. Hg temperature of the heating medium 180 to 190° C.).

Approximately 186 parts of a brittle, pale yellow resin having an NCO value of 19.8% are obtained. This resin can be dissolved in ethyl acetate to form a 67% solution with a viscosity of 725 cp./120° C. About 285 parts of monomeric mixture were removed as distillate, in which the 1,6-hexamethylene diisocyanate was found by refractometric analysis to be increased to about 89%. The aliphatic component in the trimer is present to the extent of about 40%.

EXAMPLE 2

Approximately 125 parts of freshly distilled pure 4,4'-diisocyanate-diphenylmethane (M.P.=39.4%) are dissolved by the addition of about 168 parts of 1,6-hexamethylenediisocyanate followed by heating to about 100° C. Trimerization is initiated by the addition of about 0.15 part of tri-n-butylphosphine. When the NCO content of the reaction mixture has dropped to about 35.3% in about 45 minutes, the reaction is stopped by the addition of a mixture containing about 0.1 part of p-toluene sulphonic acid methyl ester and about 0.1 part of dimethylsulphate and the reaction mixture is subjected to thin layer distillation. About 25 parts of a brittle resin and about 140 parts of distillate are obtained from about 240 parts of reaction mixture. Refractometric analysis of the distillate shows that the 4,4'-diisocyanate-diphenylmethane content has dropped to about 22.5%. The resin thus contains about 28% of 1,6-hexamethylene diisocyanate, shows an NCO value of 18.9% and dissolves in ethyl acetate to form a viscous, clear solution with a solids content of about 75%. The IR spectrum has strong absorption bands at 4.4–5, 9–6.65 and 7.0μ (weaker bands are situated at 3.4–5, 7–6.25 and 7.3μ) and thus proves the isocyanurate structure of the product.

By stopping the reaction occurring with the above-described components when the NCO content has dropped to 31.0%, approximately 122 g. of a distillate whose 4,4'-diphenylmethane diisocyanate content has been reduced to 19% as well as about 114 g. of isocyanurate having a NCO content of 15% and a molecular weight of 1036 are obtained upon thin layer distillation from about 240 g. of the reaction mixture. The ratio of the incorporated 1,6-hexamethylene diisocyanate is between 30 and 31%.

EXAMPLE 3

The following series of experiments as shown in Table I illustrate the co-catalytic effect obtained by the addition of aliphatic isocyanates to phosphine-catalyzed trimerization reactions. The results are illustrated in FIG. I as continuous curve (A).

Approximately 100 parts each of a mixture of 2,4-toluene diisocyanate and 1,6-hexamethylenediisocyanate in the ratios given below are heated to about 60° C. Trimerization is initiated by the addition of 0.1 part of tri-n-butylphosphine. The time required for the reduction of the NCO value to about 40% in the reaction mixtures is determined.

TABLE I

| Experiment | 2,4-toluene-diisocyanate, parts | 1,6-hexamethyl-ene diisocyanate, parts | Molar ratio | Time, hours |
|---|---|---|---|---|
| (a) | 0 | 100 | 0 | (¹) |
| (b) | 10 | 90 | 9.3 | 5.23 |
| (c) | 20 | 80 | 4.2 | .33 |
| (d) | 30 | 70 | 2.4 | .13 |
| (e) | 40 | 60 | 1.6 | .10 |
| (f) | 50 | 50 | 1 | (²) |

¹ Too long to measure.
² Unable to determine NCO content—formation of insoluble deposits.

Although the quantity of catalyst required for achieving similar reaction velocities is higher when solvents and lower reaction temperatures are employed, the co-catalytic effect of the aliphatic isocyanates is equally important.

About 100 parts each of a mixture of 2,4-toluene diisocyanate and 1,6-hexamethylene diisocyanate in the proportions illustrated in Table II are dissolved in about 100 parts of anhydrous, alcohol-free ethyl acetate and heated to about 60° C. The trimerization reaction is initiated by the addition of about 300 parts of tri-n-butylphosphine (approximately 0.3% based on the quantity of isocyanate put into the reaction). The time required in order to obtain an NCO value of 16% is determined. The results are illustrated as broken curve (B) in FIG. I.

TABLE II

| Experiment | 2,4-toluene-diisocyanate, parts | 1,6-hexa-methylene-diisocyanate, parts | Molar ratio | Time, hours |
|---|---|---|---|---|
| (a) | 100 | 0 | 0 | 4.5 |
| (b) | 80 | 20 | 0.26 | .77 |
| (c) | 60 | 40 | 0.69 | .58 |
| (d) | 40 | 60 | 1.56 | 1.03 |
| (e) | 20 | 80 | | (¹) |

¹ Not measurable.

The two curves A and B shown in FIG. I illustrate the time required to reach the said NCO value with different proportions of mixtures in the two systems described.

EXAMPLE 4

Examples (a) and (b) are comparison showings, while Examples (c), (d) and (e) are carried out under the conditions of the herein described process.

The following experiments are accomplished to show how polymers of predetermined compositions can be obtained according to the invention by varying the molecular ratio A or the conversion B.

(A) Variation of the molecular ratio

All the experiments of this series are carried out with 1,6-hexamethylene diisocyanate (H) and 2,4-toluylene diisocyanate (T) at 100° C. and with 0.015 percent by weight of tri-n-butylphosphine as catalyst. In Experiment 5 only (molecular ratio 5:1) it is expedient to increase the amount of catalyst up to 0.1 percent by weight. The particulars of the experiments are given in the table below:

| Experiment No | a | b | c | d | e |
|---|---|---|---|---|---|
| Molecular ratio x=1: x=1 | 0.2 | 0.5 | 1 | 2 | 5 |
| Composition of the starting product: | | | | | |
| Percent H | 16.3 | 32.5 | 49.1 | 65.9 | 82.3 |
| Percent T | 83.7 | 67.5 | 50.9 | 34.1 | 17.2 |
| NCO content after the reaction has been stopped (percent) | 41.8 | 42.0 | 41.9 | 42.1 | 42.4 |
| Conversion calculated from the yield (percent) | 20.3 | 24.1 | 20.3 | 24.5 | 23.6 |
| Composition of the distillate: | | | | | |
| Percent H | 12.0 | 31.0 | 52.0 | 74.0 | 91.0 |
| Percent T | 88.0 | 69.0 | 48.0 | 26.0 | 9.0 |
| NCO content of the end product in percent | 21.6 | 21.5 | 21.6 | 21.4 | 18.3 |
| Content of monomers in the end product in percent | 0.9 | 0.7 | 0.6 | 0.2 | 0.2 |
| Composition of the end product: | | | | | |
| Percent H | 32.7 | 37.4 | 42.0 | 44.4 | 57.0 |
| Percent T | 67.3 | 62.6 | 58.0 | 55.6 | 43.0 |
| Molecular ratio of the end product x=1: x=1 | 0.51 | 0.62 | 0.76 | 0.82 | 1.37 |
| Molecular weight | 678 | 688 | 680 | 771 | 1,010 |

At a conversion rate of 20% only, i.e., when the trimerization reaction is stopped after the NCO content has dropped to about 42%, it is thus possible to vary within certain limits the ratio of the aliphatic isocyanates incorporated in the isocyanurates by varying the molecular ratio in the starting product without an increase of the molecular weight occurring. The evaluation of this series of experiments shows that the ratio of aliphatic isocyanates in the isocyanurate is between 32 and 44%, if this ratio varies in the starting product between 12 and 74 percent by weight.

(B) Variation of conversion

All the experiments of this series are carried out with 1,6-hexamethylene diisocyanate (H) and 2,4-toluylene diisocyanate (T) at a molecular ratio of 2:1, a temperature of 60° C. and a concentration of 0.025 percent by weight of tri-n-butyl phosphine as catalyst. The reaction is stopped at various NCO contents. Particulars of the experiments are given in the table below:

| Experiment | 1 | 2 | 3 | 4 | 5 |
|---|---|---|---|---|---|
| NCO content after the reaction has been stopped (percent) | 42.1 | 38.0 | 36.0 | 34.6 | 32.5 |
| Composition of the distillate: | | | | | |
| Percent H | 74 | 81 | 86 | 90 | 95 |
| Percent T | 26 | 19 | 14 | 10 | 5 |
| NCO content of the end product in percent | 21.4 | 20.7 | 19.8 | 18.8 | 17.3 |
| Aliphatic content of the end product in percent | 44.4 | 43.2 | 42.5 | 42.0 | 40.8 |
| Viscosity of the 67% solution in ethyl acetate in cp. at 20° C | | | 400 | 725 | 1,390 | 4,400 |
| Molecular weight | 770 | 810 | 860 | 990 | 1,200 |

The reaction product obtained in Experiment 3 substantially consists of binuclear isocyanurate, while the product obtained in Experiment 5 substantially consists of a trinuclear isocyanurate.

EXAMPLE 5

The tertiary phosphines of the aliphatic or mixed aliphatic aromatic series which are suitable for carrying out the reaction differ only in their activity but not in their reaction properties. The IR-spectra of the reaction product are not varied even when using other catalysts. Particulars in respect of the relative catalytical activity are given in the table below: in all experiments about 67 g. of 1,6-hexamethylene diisocyanate and about 33 g. of 2,4-toluylene diisocyanate are stirred at 60° C. with the catalysts listed in the table.

| Catalyst | Molecular weight | Amount (mg.) | Amount (mmol) | NCO content after 3 hours |
|---|---|---|---|---|
| Triethyl phosphine | 118 | 53 | 0.45 | 23.8 |
| Tri-n-butyl phosphine | 202 | 90 | 0.45 | 36.3 |
| Tri-cyclohexylphosphine | 280 | 616 | 2.2 | 43.1 |
| Tri-isopropylphosphine | 160 | 352 | 2.2 | 45.6 |
| Phenyl dimethylphosphine | 138 | 304 | 2.2 | 38.7 |
| Phenyl dibutyl phosphine | 222 | 488 | 2.2 | 44.7 |

The table shows that the catalytical activity of the phosphines decreases as the basicity decreases and the steric hindrance increases. Therefore, the amount of catalyst required to achieve comparable reaction velocities substantially depends on the nature of the phosphine used.

EXAMPLE 6

Approximately 262 parts of dicyclohexylmethane diisocyanate-4,4' and about 87 parts of 2,4-toluylene diisocyanate (molecular ratio 2:1) are stirred ot 80° C. with 1 part of tri-n-butylphosphine until the NCO content has dropped from 36.1 to 30.0 percent within about four hours. The reaction is then interrupted by addition of 0.5 part of dimethyl sulfate and 0.5 part of p-toluene sulfonic acid methyl ester and the excess quantity of monomers is separated from unreacted diisocyanate in a thin layer evaporator at 180° C. and 1 mm./Hg. in a dry nitrogen current. There are obtained (a) approximately 262 parts of a distillate. Refractometric analysis shows that the distillate consists of 14% of 2,4-toluylene diisocyanate and of 84% of dicyclohexyldiisocyanate-4,4'; dimeric toluylene diisocyanate precipitates from the distillate upon standing for a prolonged period of time, (b) approximately 80 parts of a substantially mononuclear isocyanurate consisting of about 56% of toluylene diisocyanate and of 44% of dicyclohexyl diisocyanate-4,4'. The brittle resin has an NCO content of 21.1%, a molecular weight of 606 and dissolves in ethyl acetate and other esters without residue to yield a yellow viscous solution.

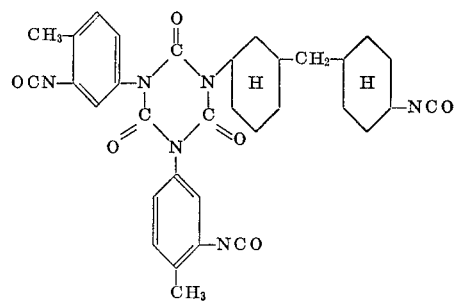

EXAMPLE 7

Approximately 140 parts of 1,4-tetramethylene diisocyanate and about 125 parts of diphenyl methane diisocyanate-2,4' (molecular ratio 2:1) are heated to about 120° C., mixed with 2 parts of phenyl dimethyl phosphine and stirred until an NCO content of about 34.3% has been reached after about 4½ hours. The reaction is then stopped by the addition of about 4 parts of a mixture of equal parts of p-toluene sulfonic acid methyl ester and dimethyl sulfate and stirring for another hour at about 100° C. and the reaction mixture is separated in a thin layer evaporator into a polymer and unreacted starting product (180° C. 1 mm./Hg). There are obtained:

(a) about 112 parts of a distillate. According to refractometric analysis the distillate consists of about 20 parts of diphenyl methane diisocyanate-2,4' and of 92 parts of tetramethylene diisocyanate;

(b) about 138 parts of a resin having an NCO content of about 16.5% which dissolves in ethyl acetate without residue. The product substantially consists of a binuclear isocyanurate, but contains small amounts of carbodiimide and ureton imine groupings.

EXAMPLE 8

Approximately 222 parts of 1-isocyanato-3-isocyanatomethyl-3,5,5-trimethylcyclohexane and about 87 parts of 2,4-toluylene diisocyanate (molecular ratio 2:1) are stirred at about 60° C. with about 0.3 part of tri-n-butylphosphine until the NCO content has dropped from about 41.0 to 32.4% within 4½ hours. The reaction is then stopped by the addition of about 0.2 part of dimethyl sulfate and about 0.2 part of p-toluene sulfonic acid methyl ester and heating to about 80° C. for one hour. Unreacted monomeric isocyanate is separated off in a thin layer evaporator at 185° C. and 1 mm./Hg. There are obtained about 218 parts of a distillate consisting of about 33 parts of aromatic diisocyanate and 185 parts of aliphatic diisocyanate as well as about 81 parts of a brittle yellow-colored resin of an NCO content of about 19.4% which has a molecular weight of about 780 and a proportion of aliphatic compounds of about 41%.

EXAMPLE 9

Approximately 194 parts of 6-chlorohexyl isocyanate and about 75 parts of diphenyl methane diisocyanate-4,4' are mixed and heated to about 120° C. with stirring. After the addition of about 0.4 part of tri-n-butyl phosphine the NCO content drops from about 28.2 to about 23.7% within about 4-5 hours. The reaction is then interrupted by the addition of about 0.9 part of a mixture of dimethyl sulfate and p-toluene sulfonic acid methyl ester and stirring at about 100° C. for another one hour. The reaction mixture has thereafter an NCO content of about 23.3% and is separated from unreacted monomers in a thin layer evaporator at 190° C. and 1 mm./Hg. There are obtained about 199 parts of a distillate which according to refractometric analysis consists of about 178 g. of chlorohexyl isocyanate and about 21 g. of diphenyl methane diisocyanate-4,4' as well as about 63.5 g. of a brittle, readily meltable resin. The resin has an NCO content of about 10.8% and dissolves in ethyl acetate to yield an about 67% solution of a viscosity of about 23 $P_{20}$. The resin is a mononuclear isocyanurate of 2 mols of aromatic isocyanate and 1 mol of aliphatic isocyanate. The resin contains small amounts of a carbodiimide which has been formed with duplication of the molecule. Chlorine content: 5.3%; molecular weight: 780.

EXAMPLE 10

Approximately 36 parts of 1-methyl-2,4-diisocyanatocyclohexane and 17.4 parts of 2,4-toluylene diisocyanate are heated to about 80° C. and stirred with about 0.13 part of tri-n-butylphosphine until the NCO content of the reaction mixture has dropped from about 47.2 to about 37.5%. The reaction is stopped by the addition of 0.1 part of a mixture of equal parts of dimethyl sulfate and p-toluene sulfonic acid methyl ester and stirring at about 80° C. for another one hour, and the reaction product is recovered from unreacted monomers in a thin layer evaporator at 175° C. and 0.5 mm. Hg. There are obtained (a) about 35.8 parts of a distillate. According to refractometric analysis the distillate consists of about 32.2 parts of aliphatic isocyanate and 3.5 parts of aromatic isocyanate and (b) about 15.2 parts of a brittle resin of an NCO content of approximately 16.5% which shows very poor flowing properties in the thin layer evaporator. The resin contains about 20% of aliphatic isocyanate. Molecular weight: 814.

EXAMPLE 11

Approximately 161 parts of 6-chlorohexylisocyanate and about 87 parts of 2,4-toluylene diisocyanate are heated to about 60° C. and mixed while stirring with about 0.25 part of tri-n-butylphosphine. The reaction is stopped already after 15 minutes at an NCO content of about 22.0% by the addition of about 0.1 part of dimethylsulfate and 0.1 part of p-toluene sulfonic acid methyl ester and heating at about 80° C. for about one hour. The unreacted monomeric diisocyanates are separated off in a subsequent thin layer distillation step at about 190° C. and 1 mm./Hg. There are obtained (a) about 148 parts of a distillate consisting of about 126 parts of chlorohexylisocyanate and about 22 parts of 2,4-toluylene diisocyanate and (b) about 89 parts of isocyanurate with an NCO content of about 12.5% and a chlorine content of about 7.6%. The resin dissolves in esters and ketones without residue and consists of a mixture of approximately equal parts of mononuclear and binuclear isocyanurates.

It is to be understood that this invention is not limited by the examples, but that any of the compositions mentioned above as typical for use in the present invention may be substituted for those set forth in the examples with similar results.

Although the invention has been described in considerable detail in the foregoing for the purpose of illustration, it is to be understood that variations can be made by those skilled in the art without departing from the spirit and scope of the invention except as set forth in the claims.

What is claimed is:

1. A method for preparing polyisocyanates having at least one isocyanurate ring which comprises polymerizing an aromatic polyisocyanate and an aliphatic or araliphatic polyisocyanate in the presence of an organic phosphine, said aliphatic or araliphatic polyisocyanate being present in such an amount that more than about 0.5 aliphatically bound —NCO group is present per aromatically bound —NCO group.

2. The method of claim 1 wherein the aliphatic polyisocyanate is present in an amount of from more than about 0.5 to about 10 aliphatic —NCO groups per aromatic —NCO group.

3. The method of claim 1 wherein the polymerization is stopped when an —NCO content has reached about 50 percent of the initial NCO value.

4. The method of claim 3 wherein the polymerization is stopped by the addition of an inhibitor selected from the group consisting of alkylating and acylating agents.

5. The method of claim 1 wherein the polyisocyanates are polymerized at a temperature of from about —20° to about 120° C.

6. The method of claim 1 wherein the organic phosphine catalyst is present in an amount of from about 0.001 to about 0.1 percent.

7. The method of claim 1 wherein the phosphine catalyst is selected from the group consisting of aliphatic, araliphatic and mixed aliphatic-aromatic phosphines.

References Cited

UNITED STATES PATENTS

| | | | |
|---|---|---|---|
| 2,683,730 | 7/1954 | Seeger et al. | 260—453 |
| 2,801,244 | 7/1957 | Balon | 260—248 |
| 2,952,665 | 9/1960 | Bunge et al. | 260—77.5 |
| 3,144,452 | 8/1964 | Wild et al. | 260—248 |
| 3,180,846 | 4/1965 | Haggis | 260—31.2 |
| 3,206,352 | 9/1965 | Gollis et al. | 161—93 |
| 3,330,828 | 7/1967 | Grogler et al. | 260—248 |
| 3,367,934 | 2/1968 | Tate et al. | 260—248 |
| 3,517,002 | 6/1970 | Heiss | 260—248 |

FOREIGN PATENTS

| | | | |
|---|---|---|---|
| 1,105,155 | 12/1961 | Germany | 260—77.5 UX |
| 1,329,110 | 4/1963 | France | 260—77.5 UX |

OTHER REFERENCES

Columbia Encyclopedia—Columbia University Press, N.Y. (1950), p. 2196.

DONALD E. CZAJA, Primary Examiner

H. S. COCKERAM, Assistant Examiner

U.S. Cl. X.R.

260—2.5 AW, 248